United States Patent
Keshmeshian et al.

(10) Patent No.: US 9,816,723 B2
(45) Date of Patent: Nov. 14, 2017

(54) SYSTEM AND METHOD TO DETERMINE A TIME TO TURN OFF COOLING EQUIPMENT BASED ON FORECASTED TEMPERATURES

(71) Applicants: Andre Keshmeshian, Highlands Ranch, CO (US); Alice Keshmeshian, Highlands Ranch, CO (US)

(72) Inventors: Andre Keshmeshian, Highlands Ranch, CO (US); Alice Keshmeshian, Highlands Ranch, CO (US)

( * ) Notice: Subject to any disclaimer, the term of this patent is extended or adjusted under 35 U.S.C. 154(b) by 0 days.

(21) Appl. No.: 15/371,195

(22) Filed: Dec. 6, 2016

(65) Prior Publication Data

US 2017/0082310 A1 Mar. 23, 2017

Related U.S. Application Data

(63) Continuation-in-part of application No. 15/239,717, filed on Aug. 17, 2016.

(60) Provisional application No. 62/206,219, filed on Aug. 17, 2015.

(51) Int. Cl.
| | | |
|---|---|---|
| G08B 17/00 | (2006.01) | |
| F24F 11/00 | (2006.01) | |
| G01K 3/10 | (2006.01) | |
| G01W 1/10 | (2006.01) | |
| G08B 21/18 | (2006.01) | |

(52) U.S. Cl.
CPC ........ *F24F 11/006* (2013.01); *F24F 11/0012* (2013.01); *G01K 3/10* (2013.01); *G01W 1/10* (2013.01); *G08B 21/182* (2013.01); *F24F 2011/0058* (2013.01); *F24F 2011/0061* (2013.01); *F24F 2011/0071* (2013.01); *F24F 2011/0075* (2013.01)

(58) Field of Classification Search
CPC ................................. G05B 1/00; G06Q 10/00
See application file for complete search history.

(56) References Cited

U.S. PATENT DOCUMENTS

| | | | | |
|---|---|---|---|---|
| 9,696,055 B1* | 7/2017 | Goodman | ............ | F24F 11/0086 |
| 2014/0095164 A1* | 4/2014 | Sone | ........................ | H04L 51/16 |
| | | | | 704/260 |
| 2016/0139582 A1* | 5/2016 | Matsuoka | .............. | G05B 15/02 |
| | | | | 700/276 |

* cited by examiner

*Primary Examiner* — Shirley Lu
(74) *Attorney, Agent, or Firm* — Leyendecker & Lemire, LLC

(57) ABSTRACT

A system and method for determining a time to turn off cooling equipment based on forecasted temperatures is described. Embodiments of the system can include, but are not limited to, a server, a smart device, and one or more weather databases. Typically, the server can obtain forecasted temperature data from the one or more weather databases and analyze the forecasted temperature data. When the server determines that a current temperature approximate a given location is about a desired temperature defined by a user, the server can send a notification to the user device. The notification can alert the user to turn off their cooling equipment.

10 Claims, 5 Drawing Sheets

SYSTEM AND METHOD TO DETERMINE A TIME TO TURN OFF COOLING EQUIPMENT BASED ON FORECASTED TEMPERATURES

CROSS-REFERENCE TO RELATED APPLICATION

This application is a continuation-in-part of U.S. patent application Ser. No. 15/239,717, filed Aug. 17, 2016.

This application further claims the benefit of U.S. Provisional Application No. 62/206,219, filed Aug. 17, 2015.

BACKGROUND

As nonrenewable energy resources are being exhausted, it is becoming more common for consumers to seek alternative methods to reduce and/or eliminate their carbon footprint. Cooling equipment that lowers the temperature of enclosed spaces, such as ones that use compressors, condensers, and evaporators, are not only expensive to operate but also significantly increase carbon footprints. Consumers can be unaware the outdoor air temperature is cool enough to turn off air conditioners and to utilize natural and/or greener methods to cool enclosed spaces. This results in consumers continuing to operate air conditioners when it is unnecessary, therefore increasing costs and carbon footprints.

Additionally, utility companies, such as Xcel energy, provide a device that can be installed on the air conditioning systems (condenser/evaporator specifically) to remotely turn off the air conditioning system. The device allows the utility company to remotely turn off the A/C unit without actually integrating their system with the thermostat that controls the system. They call it the "Saver Switch" and essentially it turns off the evaporator/condensing unit, but leaves the rest of the HVAC system still functional (e.g., fan only).

A system and method is needed to help alleviate the situation of wasting energy and increasing carbon footprints from occurring by notifying consumers to turn off their air conditioners when the outdoor air temperature reaches a consumer specified desired temperature and also ensuring that the outdoor temperature will not increase from that point forward, on a given day.

DETAILED DESCRIPTION

Figure 1:
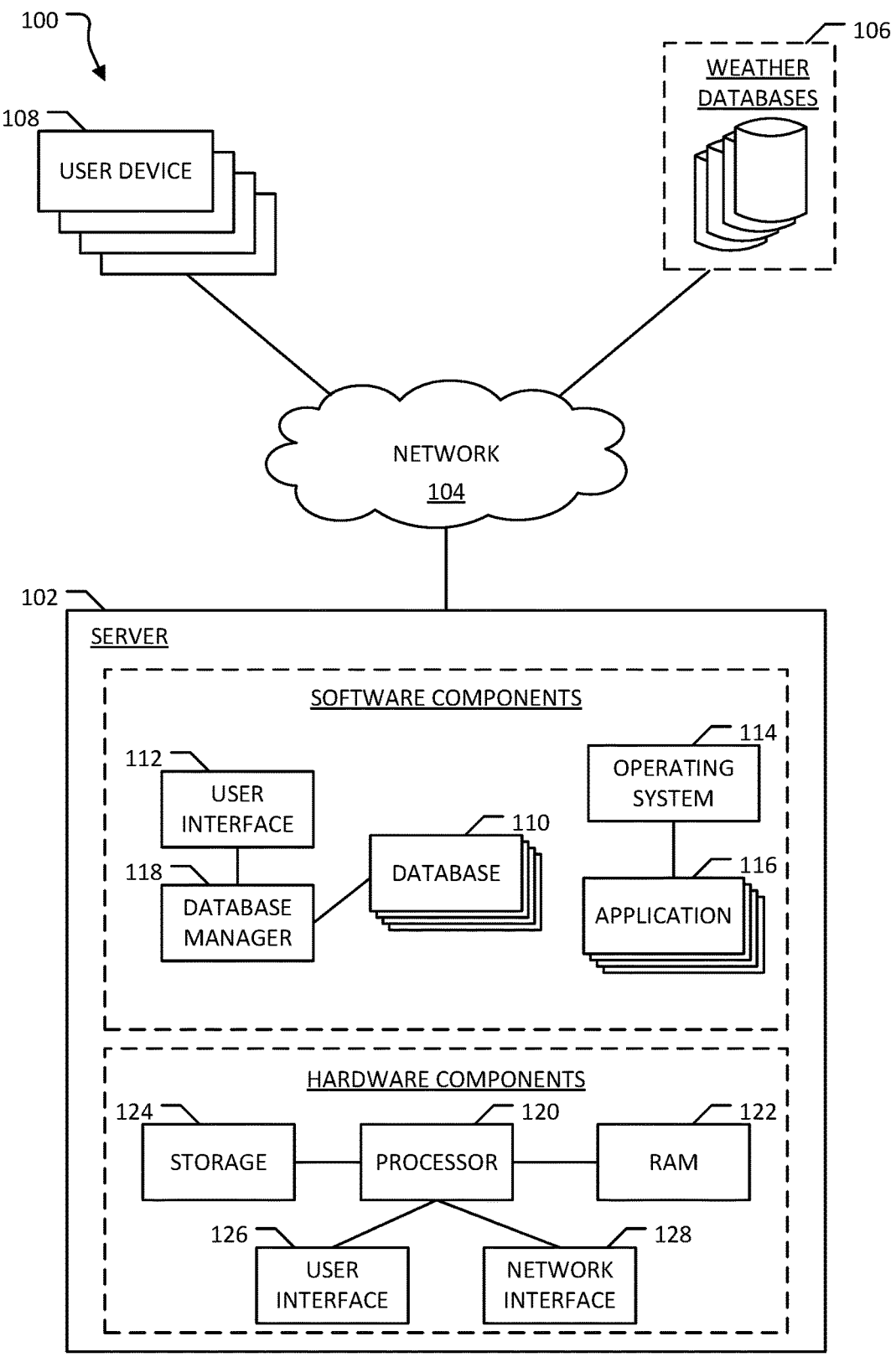
FIG. 1 is a block diagram of a temperature notification system according to one embodiment of the present invention.

Embodiments of the present invention include a system and a method to alert a user when to turn off cooling equipment. The system can include, but is not limited to, a server, a user device, a network, and one or more weather databases or services. The system can be implemented to determine when a user, based on input from the user, can turn off cooling equipment and let ambient temperatures cool a structure. For instance, a homeowner can implement the system to receive a notification when outside temperatures are at or near a desired temperature for inside the home. Typically, the server can be implemented to receive or fetch weather information from the one or more weather databases and follow the process, described hereinafter, to alert a user when the user can turn off their cooling equipment. In some embodiments, the system can alert a user of an estimated time when the user may turn off their cooling equipment. For instance, the system may provide the user of an approximate time when a forecasted temperature will be less than or equal to the desired temperature. In one embodiment, the system can determine if the desired temperature set by the user is attainable and alert the user to whether the desired temperature is attainable. The system can generally make this determination based on forecasted temperature data.

Embodiments of the present invention further include a system and a method for automatically turning off cooling equipment devices based on forecasted temperatures. The system can include, but is not limited to, a server, a network, one or more weather databases, one or more user devices, and one or more cooling equipment devices. Typically, a user device or the server can be paired or connected to a cooling equipment device. For instance, a home owner can pair or connect their smartphone with their air conditioner. As can be appreciated, the smartphone can be connected to or configured to receive instructions from the server. In one embodiment, the home owner may connect or pair the server with a thermostat system used to control a HVAC system. The user can enter data into an application on the user device that can be sent to the server. Based on the user input, the server can retrieve or receive temperature data from one or more of the weather databases. Based on data received from the weather databases, the server can determine when to shut down or turn off the cooling equipment device of the user. For instance, the server can send a signal to the thermostat system of the user to turn off the air conditioner.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of a Temperature Notification System

Referring to FIG. 1, a detailed diagram of an embodiment 100 showing a temperature notification system is illustrated. The temperature notification system 100 can be implemented to alert a user when an outside temperature can be equal to or about a desired temperature defined by the user. In some instances, the user can select to use "feels like" temperatures in lieu of actual temperatures.

Generally, the temperature notification system 100 can include a server 102, a network 104, one or more weather databases 106, and one or more user devices 108.

Generally, data related to one or more users can be stored in the server 102. For instance, the data can be stored in the one or more databases 110 of the server 102. It is to be appreciated that the data may be stored externally to the server 102. For instance, the databases 110 can be remotely located from the server 102. Typically, a user can input information into an application on a user device 108 that can then be transferred to and stored in the databases 110. Typically, a unique identifier and relevant weather information can be stored for each user in the server 102.

The server 102 can represent a server or another powerful, dedicated computer system that can support multiple user sessions. In some embodiments, the server 102 can be any type of computing device including, but not limited to, a personal computer, a game console, a smartphone, a tablet, a netbook computer, or other computing devices. In one embodiment, the server 102 can be a distributed system wherein server functions are distributed over several computers connected to a network. The server 102 can typically include a hardware platform and software components.

The software components of the server 102 can include the one or more databases 110 which can store user information and data. The software components can also include an operating system 114 on which various applications 116 can execute. In one embodiment, the server 102 can include an application dedicated to determining when a user may turn off their cooling equipment. For instance, the application can follow a process or method similar to the method described hereinafter. A database manager 118 can be an application that runs queries against the databases 110. In one embodiment, the database manager 118 can allow interaction with the databases 110 through an HTML user interface on a user device 108.

The hardware platform of the server 102 can include, but is not limited to, a processor 120, random access memory 122, and nonvolatile storage 124. The processor 120 can be a single microprocessor, multi-core processor, or a group of processors. The random access memory 122 can store executable code as well as data that can be immediately accessible to the processor. The nonvolatile storage 124 can store executable code and data in a persistent state.

The hardware platform can include a user interface 126. The user interface 126 can include keyboards, monitors, pointing devices, and other user interface components. The hardware platform can also include a network interface 128. The network interface 128 can include, but is not limited to, hardwired and wireless interfaces through which the server 102 can communicate with other devices including, but not limited to, the user devices 108.

The network 104 can be any type of network, such as a local area network, wide area network, or the Internet. In some cases, the network 104 can include wired or wireless connections and may transmit and receive information using various protocols.

The one or more weather databases 106 can include databases that provide or broadcast weather information that is available to the public. For instance, a weather database may be the National Weather Service. Typically, the plurality of weather databases 106 can store weather data and information accessible by the server 102 and, in some instances, the user devices 108.

The one or more user devices 108 can be any type of computing device on which a browser can operate. Examples of such devices can include, but are not limited to, desktop computers, laptop computers, tablet computers, mobile telephones, game consoles, network appliances, or any other web-enabled devices. In an embodiment, the user devices 108 can have various hardware platforms on which a browser can execute. The browser can be used to access the HTML user interface of the database manager 118. In one instance, the system can execute functional operations by virtue of service calls to a service-based processing system.

Typically, the temperature notification system 100 can include an application adapted to transfer information and data between the user device 108 and the server 102 via the network 104. As can be appreciated, the application can be implemented to provide a graphical interface on the user device 108 to allow the user to input information and data. The application can then send the inputted data to the server 102. The server 102 can send or push notifications to the user device 108 and the application can be configured to provide a graphical display of the notification on the user device 108.

A First Method for Implementing the Temperature Notification System

Figure 2:
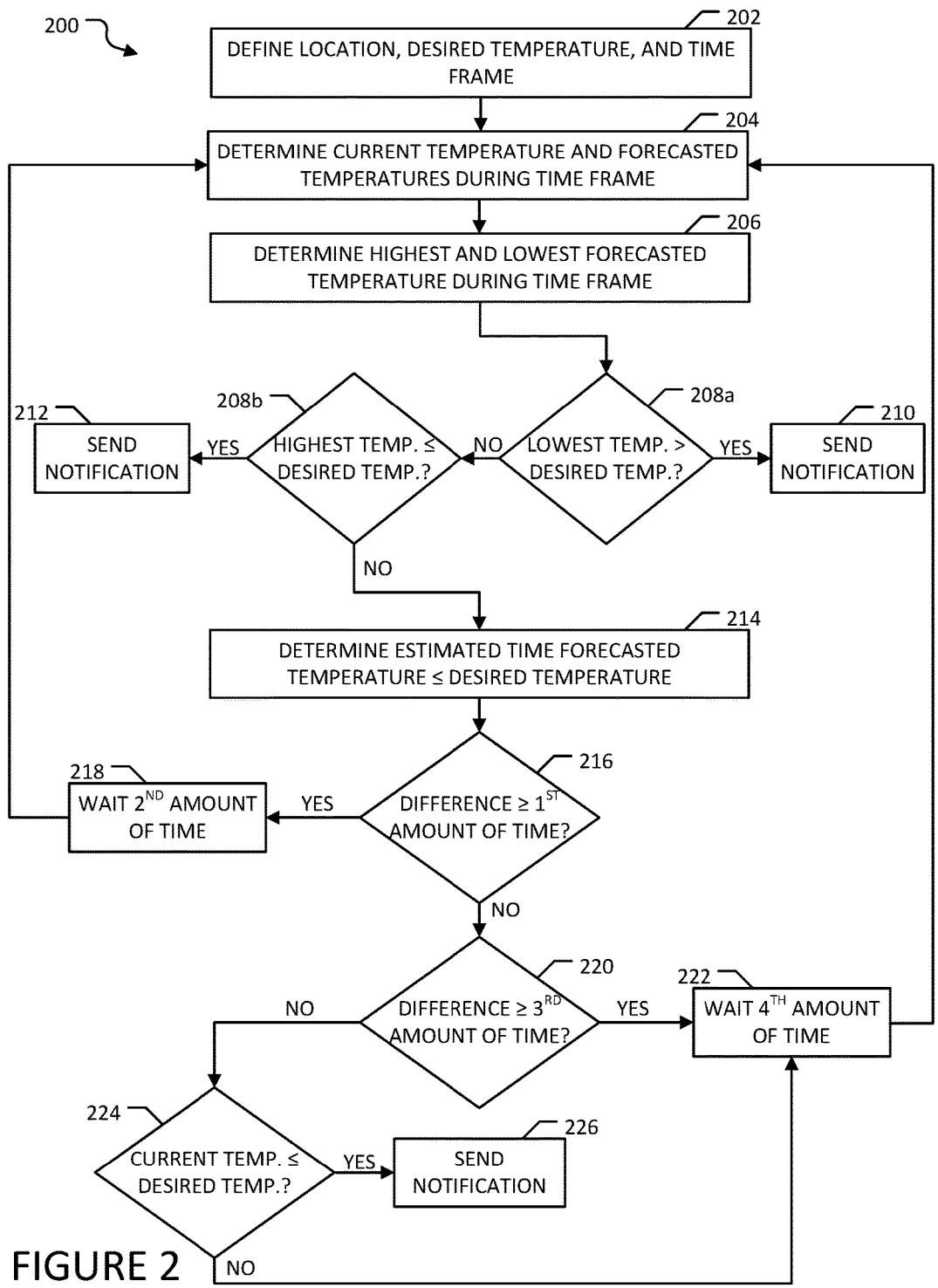
FIG. 2 is a flow diagram of a first method of implementing the temperature notification system according to one embodiment of the present invention.

Referring to FIG. 2, a flow diagram of a first method or process 200 for determining when a user may turn off their cooling equipment based on current and future weather conditions is illustrated. Typically, the temperature notification system 100 can be used in conjunction with the process 200.

As will be clear from the description hereinafter, certain portions of the process 200 can be performed by different components of the system 100, and in some instances, by a user.

In block 202, a plurality of parameters including, but not limited to, a location, a desired temperature, and a time frame can be defined by a user. Typically, the user can input numerical values for each of these parameters into the application on the user device 108. For instance, a user can access the application and input a desired temperature and a time frame, and allow the application to determine a location of the user. In some instances, the user can input a location and the application can define an appropriate location based on the input from the user. Generally, the location can be checked with one of the weather databases 106 to ensure that weather information can be obtained for the defined location. In some embodiments, a global positioning system (GPS) of the user device can be implemented to provide the location. As can be appreciated, a user would need to be located approximate a location where the user would like to have the weather monitored when using GPS.

Generally, the location can be a geographical location of a building, home, or similar structure that can be cooled by cooling equipment. Cooling equipment can include, but is not limited to, air conditioners, swamp coolers, etc. As mentioned previously, the process 200 can be implemented to determine a time when a user may turn off their cooling equipment and cool their building via ambient conditions. For instance, the user may activate a whole house fan and open windows to cool the building. The desired temperature can be a temperature defined by the user. For instance, a user may define a desired temperature of 72° F. and another user may define a desired temperature of 65° F. As can be appreciated, the desired temperature can vary depending on a particular user. The time frame can be a predetermined amount of time a user wishes to have the weather monitored by the system 100. In some instances, the time frame can be preset to a 24-hour time frame. In such an instance, the system 100 would continuously monitor the weather for 24 hours.

After the user has defined the location, the desired temperature, and the time frame, the process 200 can move to block 204. In block 204, the process 200 can determine a current temperature and retrieve data related to forecasted temperatures during the time frame for the defined location. As can be appreciated, the current temperature can be an actual temperature at a current time when the process 200 determines the current temperature. Of note, the current temperature will be based on the actual temperature when the process 200 receives weather information. Typically, the server 102 can retrieve weather data related to an approximate area of the defined location from one of the one or more weather databases 106. As can be appreciated, the server 102 can initiate retrieval of the weather data or the weather data can be pushed to the server 102 from the one or more weather databases 106.

In block 206, the process 200 can determine a highest temperature and a lowest temperature during the time frame. The server 102 can include the current temperature and the forecasted temperatures for an entirety of the time frame. Typically, the server 102 can store the current temperature and the forecasted temperatures in the server databases 110.

Once the highest temperature and the lowest temperature have been determined, the process can move to decision block 208a. If the determination made in decision block 208a is negative, the process 200 can move to decision block 208b. In another instance, the process 200 can move first to decision block 208b and then to decision block 208a if the determination made in decision block 208b is negative.

In decision block 208a, the process 200 can determine if the lowest temperature during the time frame is greater than the desired temperature. If the lowest temperature is greater than the desired temperature, the process 200 can move to block 210. In block 210, the server 102 can send a notification to the user device 108 to indicate to the user that the desired temperature is not attainable for the time frame. If the server 102 determines that the lowest temperature is not greater than the desired temperature, the process 208 can move to decision block 208b.

In decision block 208b, the process 200 can determine if the highest temperature during the time frame is less than or equal to the desired temperature. If the highest temperature is less than or equal to the desired temperature, the process 200 can move to block 212. In block 212, the server 102 can send a notification to the user device 108 to indicate that the user does not need to turn on their cooling equipment for the entire time frame. If the server 102 determines that the highest temperature is not less than or equal to the desired temperature, the process 200 can move to block 214.

Of note, once the process 200 has made the decisions from decision blocks 208a and 208b a first time, the process 200 can skip these steps when analyzing new temperature data.

In block 214, the process 200 can determine an estimated time when a forecasted temperature can be less than or equal to the desired temperature. Generally, the server 102 can receive hourly temperature forecasts for the time frame from the weather databases 106. Based on the forecasted temperatures of the time frame, the process 200 can determine when a forecasted temperature will be less than or equal to the desired temperature. For instance, the server 102 can check the forecasted temperature for each hour against the desired temperature. In one instance, the server 102 can start from the earliest time and move from forecasted temperature to forecasted temperature until the server 102 determines that a forecasted temperature is less than or equal to the desired temperature. In another instance, the server 102 can check each of the forecasted hourly temperatures starting from an end time of the time frame and move backwards through the forecasted temperatures to a current hourly forecasted temperature to determine when one of the forecasted hourly temperatures are greater than the desired temperature. Typically, after a first instance of the forecasted temperature being greater than the desired temperature is found, the server 102 can stop checking and the resulting time can be set as the estimated time.

After determining an earliest time the forecasted temperature will be less than or equal to the desired temperature, the server 102 can verify that the forecasted temperatures will not be greater than the desired temperature from the earliest time until the end of the time frame. For example, the forecasted temperature may be chilly in the morning, but warm up as the day goes on, and then cool off again. Where the chilly temperature in the morning is less than or equal to the desired temperature, the server 102 would check to make sure the remaining forecasted temperatures do not rise above the desired temperature. If the server 102 determines that the temperature will rise above the desired temperature, the server 102 will dismiss the earliest time and find the next time the temperature will be less than or equal to the desired temperature. The server 102 would then again try to verify that the remaining forecasted temperatures do not rise above the desired temperature. The server 102 would continue through the forecasted temperatures until the server 102 verifies that the forecasted temperatures after the estimated time to not rise above the desired temperature.

Once the server 102 determines an estimated time for when the forecasted temperature will be less than or equal to the desired temperature, and the remaining forecasted temperatures do not rise above the desired temperature, the process 200 can move to decision block 216. In decision block 216, the process 200 can determine if a difference between the estimated time and the current time is greater than or equal to a predetermined first amount of time. In one instance, the first amount of time can be set at 1 hour. As can be appreciated, the first amount of time can be increased or decreased without exceeding a scope of the present invention. In one example, if the current time is 10 a.m. and the estimated time is 12 p.m., the process 200 can determine that the estimated time is more than 1 hour from the current time. If the server 102 determines the difference between the estimated time and the current time is more than the first predetermined amount of time, the process 200 can move to block 218.

In block 218, the server 102 can wait a predetermined second amount of time and the process 200 can move back to block 204. In one example, the predetermined second amount of time can be set at half-an-hour. It is to be appreciated that the predetermined second amount of time can be increased or decreased without exceeding a scope of the present invention. When the process 200 returns to block 204, the process 200 can determine a current temperature and retrieve forecasted temperatures for the remaining time frame. For instance, the server 102 can get forecasted temperatures from the current time to an end of the time frame. Of note, the server 102 can use the updated weather information to determine a new highest temperature and a new lowest temperature for the defined time frame. As can be appreciated, the highest temperature and/or the lowest temperature can depend on the time frame and is not related to the highest/lowest temperature for a day.

If the server 102 determines that the difference between the estimated time and the current time is less than the first predetermined amount of time, the process 200 can move to decision block 220. In decision block 220, the process 200 can determine if a difference between the estimated time and the current time is greater than or equal to a predetermined third amount of time. Generally, the predetermined third amount of time can be less than the predetermined first amount of time. For example, where the first predetermined amount of time is 1 hour, the predetermined third amount of time can be 15 minutes. Typically, the predetermined third amount of time can be between 1-30 minutes.

If the server 102 determines that the difference between the estimated time and the current time is greater than the predetermined third amount of time, the process 200 can move to block 222. In block 222, the server 102 can wait a predetermined fourth amount of time before the process 200 moves back to block 204.

If the server 102 determines that the difference between the estimated time and the current time is less than the predetermined third amount of time, the process 200 can move to decision block 224. In decision block 224, the process 200 can determine if the current temperature is less than or equal to the desired temperature. In some embodiments, the server 102 can re-verify that the remaining forecasted temperatures in the time frame will not rise above the desired temperature. If the server 102 determines that the current temperature is not less than or equal to the desired temperature, the process 200 can move to block 222.

If the process 200 determines that the current temperature is less than or equal to the desired temperature, the process 200 can move to block 226. In block 226, the server 102 can send a notification to the user device 108 to let the user know that the user can turn off their cooling equipment.

In some instances, the server 102 can increase the frequency for checking the current temperature based on previously checked temperatures decreasing at an increased rate. For instance, when a cold front moves into a location, the temperature can drop at an accelerated rate. Based on the accelerated rate of the temperature dropping, the server 102 can increase a frequency at which the server 102 checks or receives current temperature data.

An Example of the Method for Implementing the Temperature Notification System

Described hereinafter is one example of how the process 200 can be implemented to alert a user when they may turn off their cooling equipment based on a desired temperature. As can be appreciated, the following example is for illustrative purposes only and is not meant to be limiting.

The following example may include the following assumptions. The process 200 can support an actual temperature and a feels like temperature. Regardless of which type of temperature the user has chosen, the rules and logic can remain the same. As can be appreciated, when performing a weather API call, the server 102 may use "Feels Like" or "Actual" temperature values when parsing the weather API data, depending on which one the user chooses. During a weather API call, previously saved values may be deleted and replaced with new values.

A user may access an application on their user device 108 to input a geographic location, a desired temperature, and a time frame. The user device 108 can send the information inputted into the user device 108 to the server 102 via the network 104. When the server 102 receives the inputted information, the server 102 can create a unique identifier for the user and store the related information in the server databases 110.

After the server 102 stores the information, the server 102 can create an API call to one of the weather databases 106 to retrieve forecasted temperature information for an entirety of the defined time frame for the defined location. In some instances, the server 102 can verify with a particular weather database 106 that the weather database 106 has forecast information for the defined location. Once the server 102 receives the forecast data, the server 102 can store the forecast data with the user information.

Referring now to TABLE 1, an example forecasted temperature data table is shown.

TABLE 1

| Hourly Time | Hourly Temp (° C.) | Max. Temp. | Min. Temp. |
|---|---|---|---|
| 7:00 | 24 | | |
| 8:00 | 25 | | |
| 9:00 | 26 | | |
| 10:00 | 28 | | |
| 11:00 | 29 | | |
| 12:00 | 31 | | |
| 13:00 | 32 | | |
| 14:00 | 34 | X | |
| 15:00 | 31 | | |
| 16:00 | 30 | | |
| 17:00 | 28 | | |
| 18:00 | 27 | | |
| 19:00 | 25 | | |
| 20:00 | 23 | | |
| 21:00 | 21 | | |
| 22:00 | 21 | | |
| 23:00 | 20 | | X |

In this example, a desired temperature will be defined as 24° C. and the time frame will be defined as 7 a.m. to 11 p.m, with the current time being 6:30 a.m. The server 102 would first determine the lowest temperature and the highest temperature in the time frame. Looking at Table 1, the lowest temperature would be 20° C. and the highest temperature would be 34° C. The server 102 would then determine if the lowest temperature is greater than the desired temperature. As can be affirmed, 20° C. is not greater than 24° C. The server 102 would next determine if the highest temperature is less than or equal to the desired temperature. As can be affirmed, 34° C. is not less than or equal to 24° C. As such, the server 102 would continue to analyze the forecast data.

The server 102 can next find when the forecasted temperature is less than or equal to the desired temperature. As shown in Table 1, at 7 a.m. the forecasted (or actual temperature) is equal to the desired temperature. The server 102 would next try to verify that all forecasted temperatures after 7 a.m. were less than or equal to the desired temperature. The server 102 would then determine that the temperature is rising as the forecasted temperature for 8 a.m. is 25° C. Since the server 102 determined that the forecasted temperature will rise above the desired temperature after 7 a.m., the server 102 would dismiss 7 a.m. and move to the next time that the forecasted temperature is less than or equal to the desired temperature. The server 102 would next determine that at 8 p.m. the forecasted temperature will fall below the desired temperature. The server 102 would then next verify that all forecasted temperatures after 8 p.m. will be less than or equal to the desired temperature. Based on the data in Table 1, the server 102 would determine that the temperature will not rise above the desired temperature and can set 8 p.m. as the estimated time.

Next, the server 102 can determine if a difference between a current time and the estimated time is greater than or equal to the predetermined first amount of time. In this example, the first amount of time will be 60 minutes, the second amount of time will be 30 minutes, the third amount of time will be 30 minutes, and the fourth amount of time will be 5 minutes. For example, if the current time is 2 p.m., then the difference between the current time and the estimated time would be 12 hours, which is greater than 60 minutes. The server 102 would then wait for another 60 minutes before getting updated temperature information and proceeding through the previous steps again. When the current time is 7:30, the difference between the current time and the estimated time would be 30 minutes. The server 102 would then make the determination that the difference in time is equal to the third amount of time and would then wait the fourth amount of time of 5 minutes before getting updated temperature data. Once the difference in time is less than the third amount of time, the server 102 would check to see if the current temperature is less than or equal to the desired temperature. If it is not, the server 102 would wait another 5 minutes before getting update temperatures. Once the server 102 determines that the current temperature is less than or equal to the desired temperature, the server 102 would generate a signal and send the signal to the user device.

The application would receive the signal from the server 102 and present a graphical notification to the user on the user device 108 that the desired temperature has been reached and the user may turn off their cooling equipment.

An Embodiment of an Automated Cooling Equipment System

Figure 3:
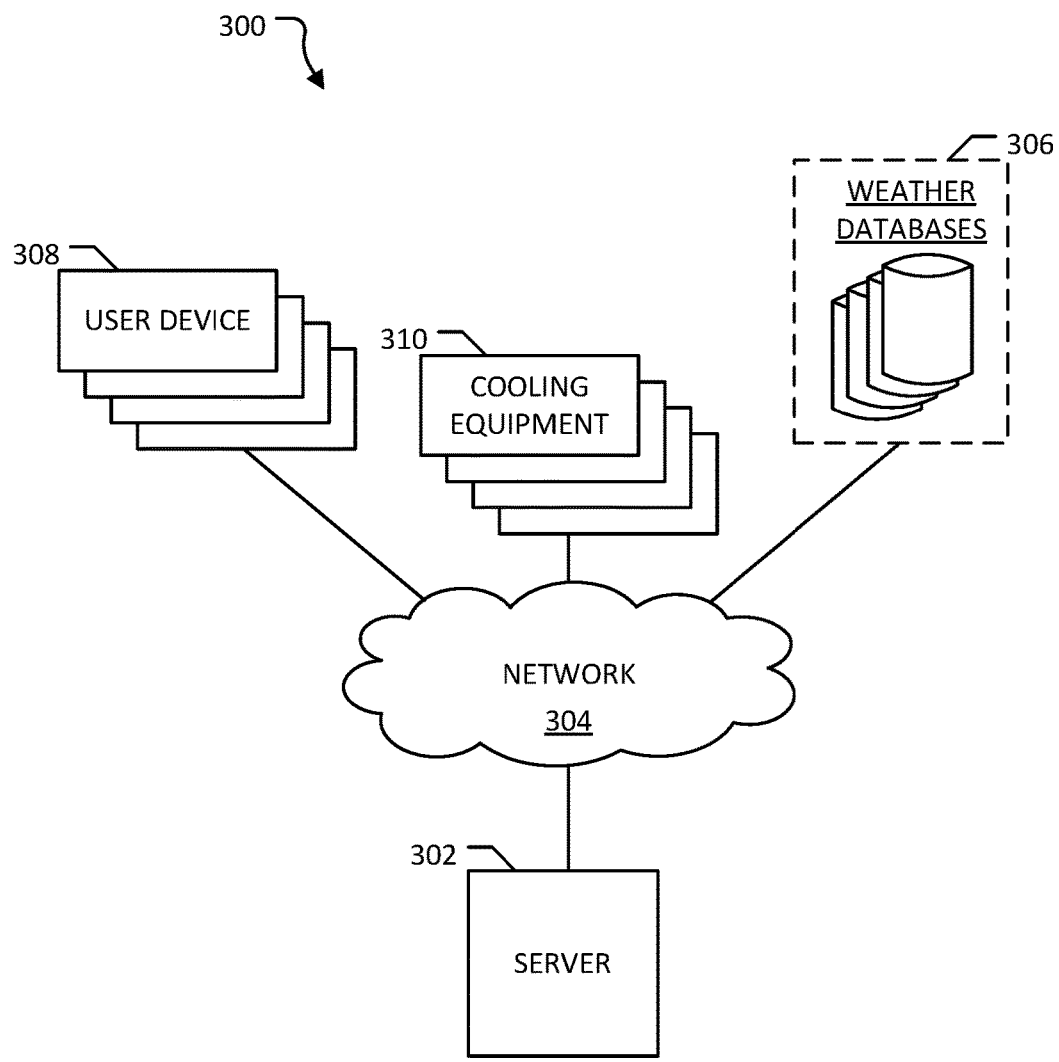
FIG. 3 is a block diagram of an automated cooling equipment system according to one embodiment of the present invention.

Referring to FIG. 3, a detailed diagram of an embodiment 300 showing an automated cooling equipment system is illustrated. The automated cooling equipment system 300 can be implemented to automatically shut-off, or keep turned off, cooling equipment based on weather conditions.

Typically, components from the automated cooling equipment system 300 including, but not limited to, a server 302, a network 304, weather databases 306, and one or more user devices 308 can be substantially similar to the components of the temperature notification system 100.

The automated cooling equipment system 300 can further include one or more cooling equipment devices 310. As mentioned previously, cooling equipment devices can include, but are not limited to, air conditioners, swamp coolers, etc. In one embodiment, the cooling equipment devices 310 can include a means for communicating with the server 302. For instance, a cooling equipment device may include a network interface for communication between the device 310 and the server 302. For example, the cooling equipment device 310 may include a network interface similar to the network interface 128 of the server 102. In another instance, the cooling equipment device 310 may be connected to a local area network, where the local area network is in communication with the server 302 via the network 304. As is further known by one of ordinary skill in the art, the cooling equipment device 310 may be remotely shut down via a signal received via the network interface. In another embodiment, the server 302 can be connected to the cooling equipment device 310 via a thermostat system. For instance, the server 302 can be connected to a smart thermostat that can be connected to the network 304.

As will be described hereinafter, the server 302 may generate a signal to shut down a cooling equipment device 310 based on information inputted into a user device 308 and data received from one or more of the weather databases 306. For instance, the server 302 may send a signal to the cooling equipment device 310 via the network 304. Typically, each of the user devices 308 can be associated with one of the cooling equipment devices 310.

A Method for Implementing the Automated Cooling Equipment System

Figure 4:
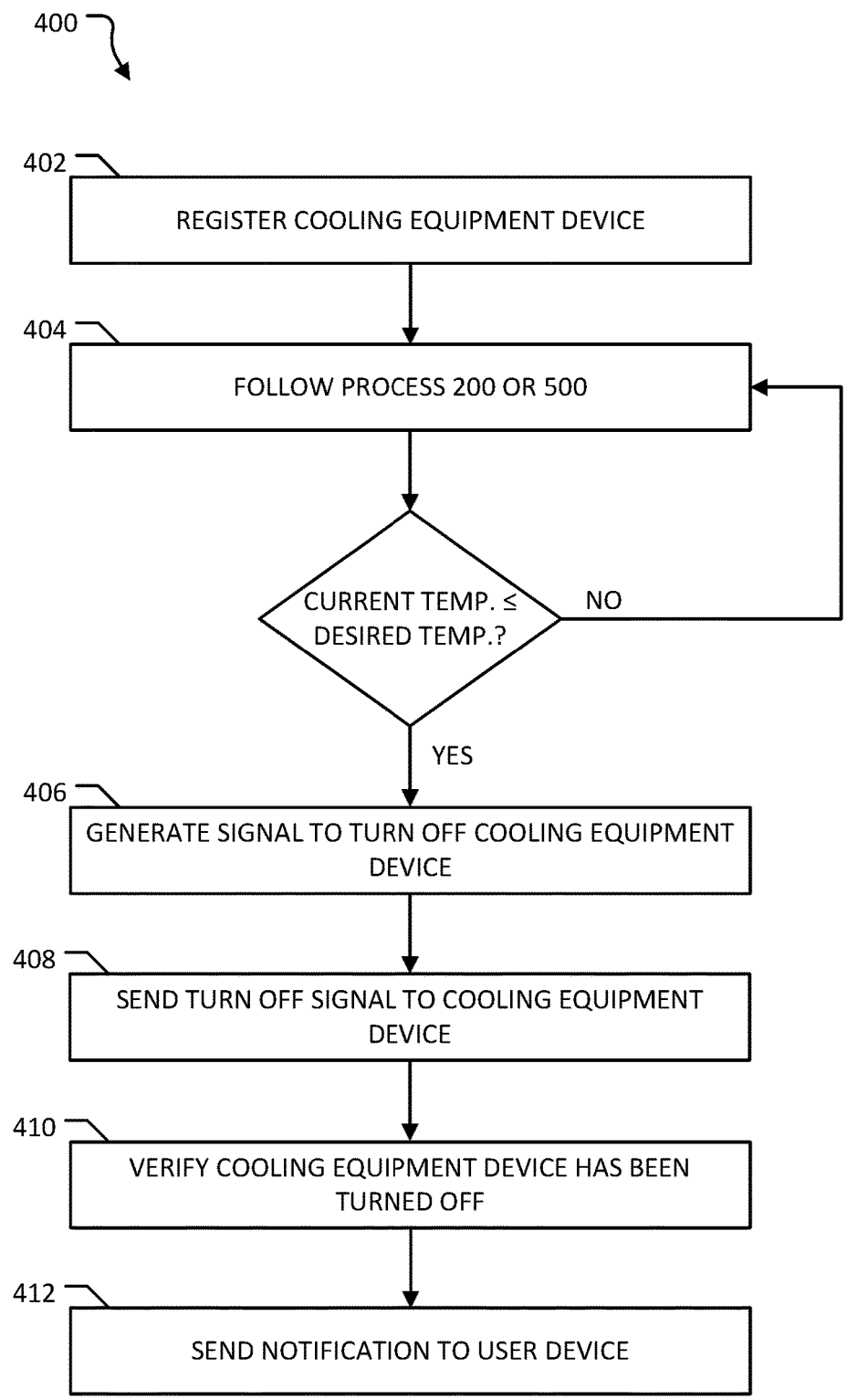
FIG. 4 is a flow diagram of a method of implementing the automated cooling equipment system according to one embodiment of the present invention.

Referring to FIG. 4, a flow diagram of a method or process 400 for determining when the system 300 may turn off the cooling equipment device 310 based on current and future weather conditions is illustrated. Typically, the system 300 can be used in conjunction with the process 400.

In block 402, a cooling equipment device 310 can be registered with the server 302. Typically, a user can register their cooling equipment device 310 via their user device 308 to register the cooling equipment device. The server 302 can then link the cooling equipment device 310 with the user device 308 that registers the cooling equipment device 308.

Once the cooling equipment device 310 has been registered, the process 400 can move to block 404. In block 404, the process 400 can implement the previously described process 200 for notifying a user when they may turn off their cooling equipment. Of note, once the process 400, following the process 200 (or 500), gets to decision block 220 (or 514/518), the process 400 can move to block 406 if the process 400 determines that the current temperature is less than or equal to the desired temperature. If the process 400 determines that the current temperature is greater than the desired temperature, the process 400 can restart the process 200 (or 500) until the process 400 determines that a current temperature is equal to or less than the desired temperature.

In block 406, the process 400 can generate a signal to send to the cooling equipment device 310 to turn off. For instance, the server 302 can generate a "turn off" signal to send to the cooling equipment device 310 via the network 304.

In block 408, the process 400 can send the signal to the cooling equipment device 310.

In block 410, the process 400 can verify that the cooling equipment device 310 has been turned off. In one instance, the server 302 can send a notification to the user via the user device 308 to have the user verify that the cooling equipment device 310 has been shut off. In another instance, the server 302 can send a signal to the cooling equipment device 310 to verify that the cooling equipment device 310 has been turned off.

In block 412, once the process 400 has verified that the cooling equipment device 310 has been shut down, the process 400 can send a notification to the user device 308.

A Second Method for Implementing the Temperature Notification System

Figure 5:
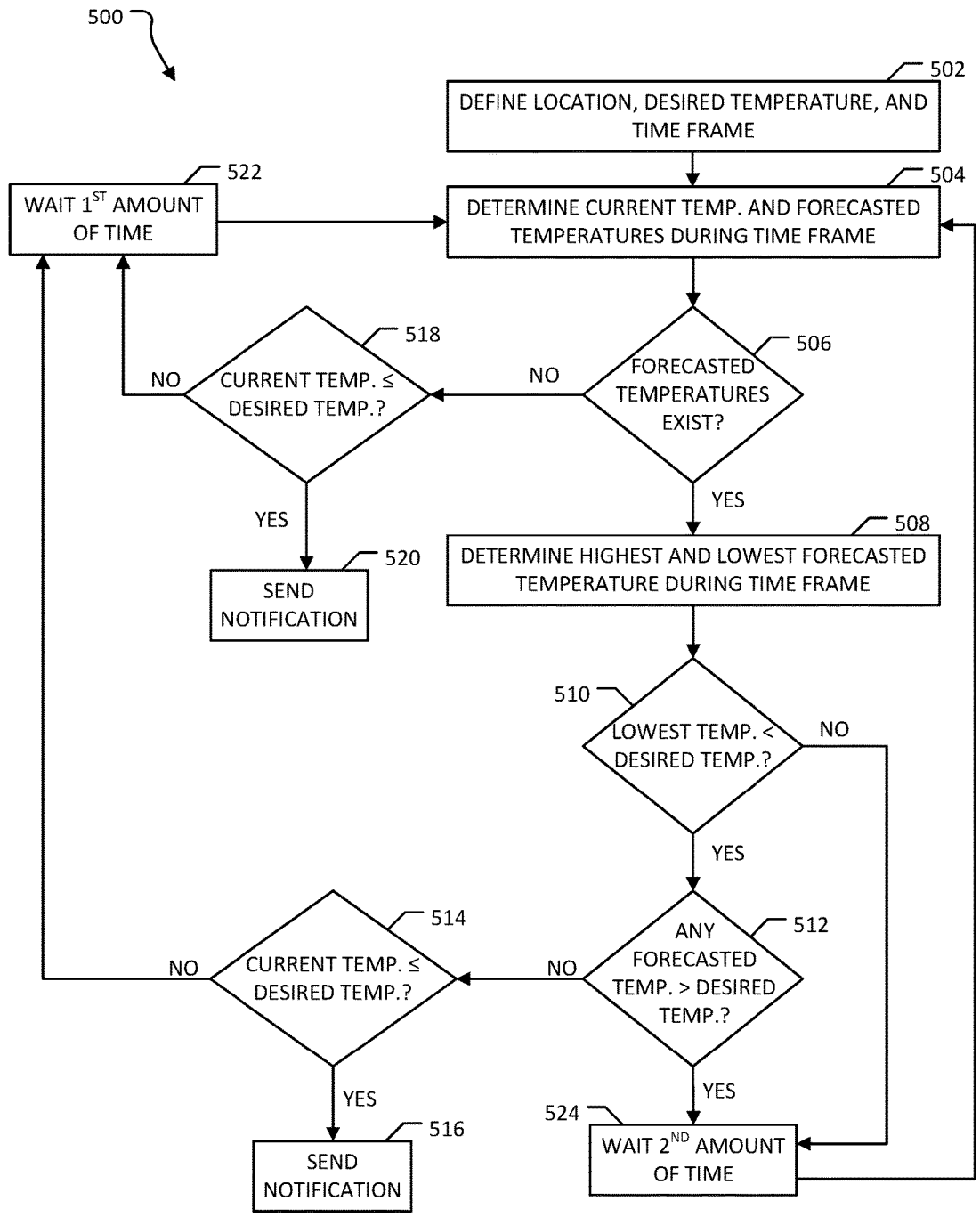
FIG. 5 is a flow diagram of a second method of implementing the temperature notification system according to one embodiment of the present invention.

Referring to FIG. 5, a flow diagram of a second method or process 500 for determining when a user may turn off their cooling equipment based on current and future weather conditions is illustrated. Typically, the temperature notification system 100 can be used in conjunction with the second process 500.

As will be clear from the description hereinafter, certain portions of the second process 500 can be performed by different components of the system 100, and in some instances, by a user.

In block 502, a plurality of parameters including, but not limited to, a location, a desired temperature, and a time frame can be defined by a user. Typically, the user can input numerical values for each of these parameters into the application on the user device 108. In some embodiments, the user may access a web based portal similar to the application where they user may input information to be stored by the server 102.

After the user has defined the location, the desired temperature, and the time frame, the process 500 can move to block 504. In block 504, a current temperature and forecasted temperatures can be determined. In one instance, the server 102 can retrieve data related to the current temperature and the forecasted temperatures from one of the weather databases 106. As can be appreciated, the current temperature can be an actual temperature at a time when the process 500 receives the current temperature data.

In decision block 506, a determination can be made if there are any forecasted temperatures. Typically, the server 102 will retrieve or be sent hourly forecasted temperature data for an amount of time left in the time frame. When the time is getting close to end of the time frame, the process 500 can determine if the server 102 is receiving anymore hourly temperature forecasts. If the process 500 determines the server 102 is receiving hourly temperature forecast data, the process 500 can move to block 508. If the process 500 determines the server 102 is not receiving hourly temperature forecast data, the process 500 can move to decision block 518.

In block 508, the process 500 can determine a highest temperature and a lowest temperature during the time frame. The server 102 can include the current temperature and the forecasted temperatures for an entirety of the time frame when determining the highest temperature and the lowest temperature.

In decision block 510, the process 500 can determine if the lowest temperature is less than the desired temperature. Typically, the server 102 can make a determination if the desired temperature is attainable for the day. If the lowest temperature is not less than the desired temperature, the process 500 can move to block 522. Generally, when the server 102 makes a determination that the lowest temperature is greater than the desired temperature, the server 102 may send a notification to the user that the desired temperature is not attainable for the time frame. In some embodiments, the process 500 may continue to repeat until the end of the time frame. In one embodiment, the process 500 may end if the process 500 determines that the lowest temperature for the time frame is greater than the desired temperature. If the lowest temperature is less than the desired temperature, the process 500 can move to block 524.

In decision block 512, the process 500 can determine if any of the forecasted temperatures are greater than the desired temperature. If the process 500 determines that none of the forecasted temperatures are greater than the desired temperature, the process 500 can move to decision block 514. If the process 500 determines that at least one of the forecasted temperatures are greater than the desired temperature, the process 500 can move to block 524.

Typically, the server 102 can check each of the forecasted hourly temperatures starting from an end time of the time frame and move backwards through the forecasted temperatures to a current hourly forecasted temperature to determine when one of the forecasted hourly temperatures are greater than the desired temperature. Typically, after a first instance of the forecasted temperature being greater than the desired temperature is found, the server 102 can stop checking and the resulting time can be set as an estimated time. In some embodiments, the server 102 can send data correlating to the estimated time to a user device. The application running on the user device can receive the data and present the data to the user in the application indicating an estimated time of when the user may turn off their cooling equipment. Of note, the server 102 can help ensure that when a notification is sent to the user, the temperature will not rise above the desired temperature after the notification is sent.

Referring back to Table 1 for an example, the server 102 can start at the end time (e.g. 23:00), move backwards in time, and compare the forecasted temperatures to the desired temperature. The server 102 can check to see when a first instance of the forecasted temperatures being greater than the desired temperature occurs. Based on a desired temperature of 24° C., at 19:00 the forecasted temperature would be a first time that the forecasted temperature is greater than the desired temperature. In this example, the estimated time would be stored as 19:00 in the server 102. The server 102 may then send this data to the user device and have the application provide a graphical representation of this information to the user. For instance, the user may access the application and the application may present a graphical representation of an estimated time that the user may turn off their cooling equipment.

In decision block 514, the process 500 can determine if the current temperature is less than or equal to the desired temperature. The process 500 can further determine if a current time is approximate the estimated time. If the current temperature is less than or equal to the desired temperature, the process 500 can move to block 516. In block 516, a notification can be sent to a user that they may turn off their cooling equipment.

When the process 500 moves from decision block 506 to decision block 518, the process 500 can determine if the current temperature is less than or equal to the desired temperature in block 518. If the current temperature is not less than or equal to the desired temperature, the process 500 can move to block 522. If the current temperature is less than or equal to the desired temperature, the process 500 can move to block 520.

In block 520, similar to block 516, a notification can be sent to a user that they may turn off their cooling equipment. Typically, the server 102 can send a notification to the user device 108. The application running on the user device 108 can receive the notification from the server 102 and generate a graphical representation of the notification on a display of the user device 108.

In block 522, the process 500 can wait a first amount of time before moving back to block 504. In block 524, the process 500 can wait a second amount of time before moving back to block 504. As can be appreciated, the first amount of time can be less than, equal to, or more than the second amount of time. In one example, the first amount of time can be about 5 minutes and the second amount of time can be about 15 minutes. Of note, if the process 500 moves to decision block 514, essentially the process 500 has determined that the current temperature should reach the desired temperature soon, since there are no more forecasted temperatures greater than the desired temperature.

Of note, when the process 500 moves back to block 504, the process 500 can re-determine a current temperature and forecasted temperatures for the remaining time frame. The process 500 can then proceed until the process 500 sends a notification in block 516 or block 520. As can be appreciated, if the process 500 does not send a notification in block 516 or block 520, the process 500 can end when the current time is later than the end of the time frame.

In a typical implementation of the process 500, the process 500 can be started at a beginning of the time frame and run until the process 500 has determined that the user may turn off their cooling equipment, or until the end of the time frame is reached. Typically, during each running of the process 500, the server 102 may store new temperature data and delete previously obtained temperature information.

As can be appreciated, during several of the steps previously described, the server 102 may send status updates to a user device 108 based on various determinations being made. The status updates may include data, information, etc. to be presented to a user.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A system comprising:
  at least one processor; and
  at least one non-transitory computer-readable storage media having stored thereon computer-executable instructions that, when executed by the at least one processor, causes the system to perform a method, the method comprising the following:
  receiving a geographical location, a desired temperature, and a time frame;
  obtaining a first current temperature and a first at least one forecasted temperature for the geographical location;
  storing the first current temperature and the first at least one forecasted temperature;
  determining a highest temperature and a lowest temperature based on the first current temperature and the first at least one forecasted temperature;
  sending a first notification to a user device if the highest temperature is less than or equal to the desired temperature;
  sending a second notification to the user device if the lowest temperature is more than the desired temperature;
  determining an estimated time when one of the first at least one forecasted temperatures is less than or equal to the desired temperature;
  obtaining a second current temperature and a second at least one forecasted temperature for the geographical location;
  storing the second current temperature and the second at least one forecasted temperature for the geographical location;
  deleting the first current temperature and the first at least one forecasted temperature; and determining if the first notification or the second notification need to be sent based on the second current temperature and the second at least one forecasted temperature.

2. The method of claim 1, wherein the system obtains the current temperature and the at least one forecasted temperature from a weather database.

3. The method of claim 1, the method further comprising:
determining a highest temperature and a lowest temperature based on the second current temperature and the second at least one forecasted temperature;
determining an estimated time when one of the second at least one forecasted temperatures is less than or equal to the desired temperature.

4. The method of claim 3, the method further comprising:
sending a third notification to the user device if the desired temperature is equal to or less than the second current temperature.

5. The method of claim 3, the method further comprising:
sending the third notification to the user device if the desired temperature is equal to or less than the third current temperature.

6. The method of claim 4, the method further comprising the following steps if the desired temperature is not equal to or less than the second current temperature:
obtaining a third current temperature and a third at least one forecasted temperature for the geographical location;
storing the third current temperature and the third at least one forecasted temperature for the geographical location; and
deleting the second current temperature and the second at least one forecasted temperature.

7. The method of claim 6, the method further comprising:
determining a highest temperature and a lowest temperature based on the third current temperature and the third at least one forecasted temperature;
determining an estimated time when one of the third at least one forecasted temperatures is less than or equal to the desired temperature.

8. The method of claim 1, wherein the highest temperature is defined as the highest temperature from a current time to an end time of the time frame.

9. The method of claim 8, wherein the lowest temperature is defined as the lowest temperature from the current time to the end time of the time frame.

10. The method of claim 1, the method further comprising:
generating a signal adapted to turn off a cooling equipment device; and
sending the signal to the cooling equipment device when the highest temperature is less than or equal to the desired temperature.

* * * * *